United States Patent
Bae et al.

(10) Patent No.: US 12,074,271 B2
(45) Date of Patent: Aug. 27, 2024

(54) LITHIUM SECONDARY BATTERY INCLUDING ELECTROLYTE ADDITIVE FOR LITHIUM SECONDARY BATTERY

(71) Applicant: SAMSUNG SDI CO., LTD., Yongin-si (KR)

(72) Inventors: Taehyon Bae, Yongin-si (KR); Aehui Goh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 521 days.

(21) Appl. No.: 17/439,089

(22) PCT Filed: Feb. 13, 2020

(86) PCT No.: PCT/KR2020/002063
§ 371 (c)(1),
(2) Date: Sep. 14, 2021

(87) PCT Pub. No.: WO2020/197093
PCT Pub. Date: Oct. 1, 2020

(65) Prior Publication Data
US 2022/0158224 A1    May 19, 2022

(30) Foreign Application Priority Data
Mar. 28, 2019 (KR) .................. 10-2019-0036213

(51) Int. Cl.
*H01M 10/0525* (2010.01)
*H01M 10/0567* (2010.01)
(Continued)

(52) U.S. Cl.
CPC ... *H01M 10/0525* (2013.01); *H01M 10/0567* (2013.01); *H01M 10/0568* (2013.01); *H01M 10/0569* (2013.01); *H01M 2300/0028* (2013.01)

(58) Field of Classification Search
CPC ......... H01M 10/0525; H01M 10/0567; H01M 10/0568; H01M 10/0569;
(Continued)

(56) References Cited

U.S. PATENT DOCUMENTS 6,800,400 B2   10/2004  Ota et al.
9,040,203 B2 *  5/2015  Kim .................. H01M 4/485
                                                429/231.95
(Continued)

FOREIGN PATENT DOCUMENTS

JP   2002-319431 A   10/2002
JP   4187959         11/2008
(Continued)

OTHER PUBLICATIONS

Yilong Lin, et al., Optimal concentration of electrolyte additive for cyclic stability improvement of high-voltage cathode of lithium-ion battery. Ionics. 2018., vol. 24, pp. 661-670.
(Continued)

*Primary Examiner* — Abdullah A Riyami
*Assistant Examiner* — Nader J Alhawamdeh
(74) *Attorney, Agent, or Firm* — Lee IP Law, P.C.

(57) ABSTRACT

Disclosed herein is a lithium secondary battery including: a cathode; an anode; and an electrolyte interposed between the cathode and the anode, the electrolyte including at least one compound (A) represented by Formula 1 below and at least one compound (B) represented by Formula 2 below, and the lithium secondary battery having an operating voltage of 4.45 V or more:

(Continued)

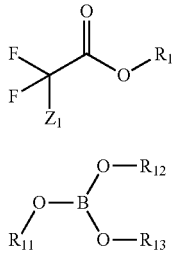

<Formula 1>

<Formula 2>

For the description of $R_1$, $R_{11}$ to $R_{13}$, and $Z_1$ in Formula 1, refer to the present specification.

16 Claims, 11 Drawing Sheets

(51) Int. Cl.
*H01M 10/0568* (2010.01)
*H01M 10/0569* (2010.01)

(58) Field of Classification Search
CPC ....... H01M 2300/0028; H01M 10/052; H01M 4/525; H01M 10/4235; Y02E 60/10
See application file for complete search history.

(56) References Cited

U.S. PATENT DOCUMENTS

| | | | | |
|---|---|---|---|---|
| 9,640,840 | B2* | 5/2017 | Nakatsutsumi | H01M 4/483 |
| 9,847,554 | B2* | 12/2017 | Cha | H01M 10/0568 |
| 9,908,786 | B2* | 3/2018 | Lee | C01D 15/02 |
| 10,199,686 | B2* | 2/2019 | Cha | H01M 10/0567 |
| 10,320,032 | B2* | 6/2019 | Kim | H01M 10/052 |
| 10,547,083 | B2 | 1/2020 | Cheng et al. | |
| 10,727,536 | B2* | 7/2020 | Park | H01M 4/1315 |
| 11,127,978 | B2* | 9/2021 | Son | H01M 10/4235 |
| 11,145,900 | B2* | 10/2021 | Son | H01M 10/4235 |
| 11,183,709 | B2* | 11/2021 | Jeong | C08J 3/24 |
| 11,251,432 | B2* | 2/2022 | Son | H01M 10/0569 |
| 11,264,644 | B2* | 3/2022 | Son | H01M 10/0525 |
| 11,335,952 | B2* | 5/2022 | Son | H01M 10/0525 |
| 11,367,862 | B2* | 6/2022 | Kim | H01M 10/0525 |
| 11,527,773 | B2* | 12/2022 | Park | H01M 10/0569 |
| 11,830,978 | B2* | 11/2023 | Woo | H01M 10/0569 |
| 2021/0376309 | A1* | 12/2021 | Son | H01M 4/366 |
| 2021/0376314 | A1* | 12/2021 | Son | H01M 4/366 |
| 2022/0158224 | A1* | 5/2022 | Bae | H01M 10/052 |
| 2022/0263131 | A1* | 8/2022 | Tsay | H01M 10/567 |
| 2022/0320498 | A1* | 10/2022 | Kapylou | H01M 10/0525 |
| 2022/0407054 | A1* | 12/2022 | Lim | H01M 10/0569 |
| 2022/0407055 | A1* | 12/2022 | Choi | H01M 4/525 |
| 2022/0407058 | A1* | 12/2022 | Seo | H01M 10/0568 |
| 2022/0407113 | A1* | 12/2022 | Cho | C01G 53/50 |
| 2022/0407114 | A1* | 12/2022 | Koh | H01M 4/505 |
| 2023/0268485 | A1* | 8/2023 | Moon | H01M 4/5825 |
| | | | | 429/231.95 |
| 2024/0030402 | A1* | 1/2024 | Lee | H01M 4/62 |

FOREIGN PATENT DOCUMENTS

| | | | | |
|---|---|---|---|---|
| JP | 5923747 | | 4/2016 | |
| KR | 10-2014-0092746 A | | 7/2014 | |
| WO | WO 2016-209843 A1 | | 12/2016 | |
| WO | WO 2016/209844 A2 | | 12/2016 | |
| WO | WO-2016209843 A1 * | | 12/2016 | ........ H01M 10/0525 |

OTHER PUBLICATIONS

Korean Office action dated Nov. 3, 2021.

* cited by examiner

LITHIUM SECONDARY BATTERY INCLUDING ELECTROLYTE ADDITIVE FOR LITHIUM SECONDARY BATTERY

CROSS REFERENCE TO RELATED APPLICATIONS

This is the U.S. national phase application based on PCT Application No. PCT/KR2020/002063, filed Feb. 13, 2020, which is based on Korean Patent Application No. 10-2019-0036213, filed Mar. 28, 2019, the entire contents of all of which are hereby incorporated by reference.

TECHNICAL FIELD

The present disclosure relates to a lithium secondary battery including an electrode additive for lithium secondary batteries.

BACKGROUND ART

Lithium secondary batteries are used as power sources for driving portable electronic appliances such as video cameras, mobile phones, and notebook computers. Rechargeable lithium secondary batteries have three times higher energy density per unit weight than known lead batteries, nickel-cadmium batteries, nickel metal hydride batteries, and nickel-zinc batteries, and may be charged at high speed.

Since lithium secondary batteries operate at a high driving voltage, aqueous electrolytes having high reactivity with lithium cannot be used. An organic electrolyte is generally used as the electrolyte for lithium secondary batteries. An organic electrolyte is prepared by dissolving a lithium salt in an organic solvent. It is preferred that the organic solvent is stable at a high voltage, and has high ionic conductivity, a high dielectric constant, and low viscosity.

However, $LiPF_6$, which is most widely used lithium salt in electrolytes, has a problem in that it reacts with an electrolyte solvent to accelerate the depletion of the solvent and generate a large amount of gas. When $LiPF_6$ decomposes, LiF and $PF_5$ are generated, which causes electrolyte depletion in the battery and leads to deterioration of high-temperature performance and poor safety.

In particular, as electronic appliances using a lithium secondary battery have recently become more and more high-performance, lithium secondary batteries of higher capacity are required. In order to realize such high capacity, a high voltage of more than 4.45 V is required. However, under a high-voltage environment, the instability of a cathode due to the high voltage and the side reaction of the above-described electrolyte are exacerbated, and thus there is a problem in that the lifespan and swelling performance of the battery are deteriorated.

Therefore, there is a need for an electrolyte for a lithium secondary battery capable of providing a lithium secondary battery having improved high-voltage reversible performance and high-temperature lifespan characteristics by suppressing the side reaction of an electrolyte while exhibiting a high capacity through such a high voltage.

DESCRIPTION OF EMBODIMENTS

Technical Problem

An aspect is to provide a lithium secondary battery including a novel electrolyte for lithium secondary batteries.

Solution to Problem

According to an aspect, there is provided a lithium secondary battery comprising: a cathode; an anode; and an electrolyte interposed between the cathode and the anode, wherein the electrolyte includes at least one compound (A) represented by Formula 1 below and at least one compound (B) represented by Formula 2 below, and the lithium secondary battery has an operating voltage of more than 4.45 V:

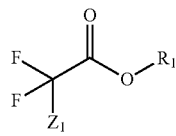

<Formula 1>

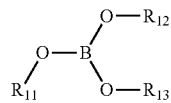

<Formula 2> wherein, in Formulae 1 and 2, $R_1$ and $R_{11}$ to $R_{13}$ are each independently selected from a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group, $Z_1$ is selected from hydrogen, a halogen, a cyano group, a $C_1$-$C_{10}$ alkoxy group, a hydroxyl group, a nitro group, a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group, and a substituent of each of the substituted $C_1$-$C_{30}$ alkyl group, substituted $C_2$-$C_{30}$ alkenyl group, and substituted $C_2$-$C_{30}$ alkynyl group is at least one selected from a $C_1$-$C_{10}$ alkyl group, a $C_2$-$C_{10}$ alkenyl group, a $C_1$-$C_{10}$ alkoxy group, a halogen, a cyano group, a hydroxyl group, and a nitro group.

Advantageous Effects of Disclosure

According to an aspect, when a novel electrolyte including an additive including a difluoroacetate-based compound and an alkylborate-based compound is used for high-voltage lithium secondary batteries, high-voltage reversible performance and high-temperature lifespan characteristics of the lithium secondary battery may be improved.

EXPLANATION OF SYMBOLS FOR MAIN PARTS OF DRAWINGS

Figure 1:
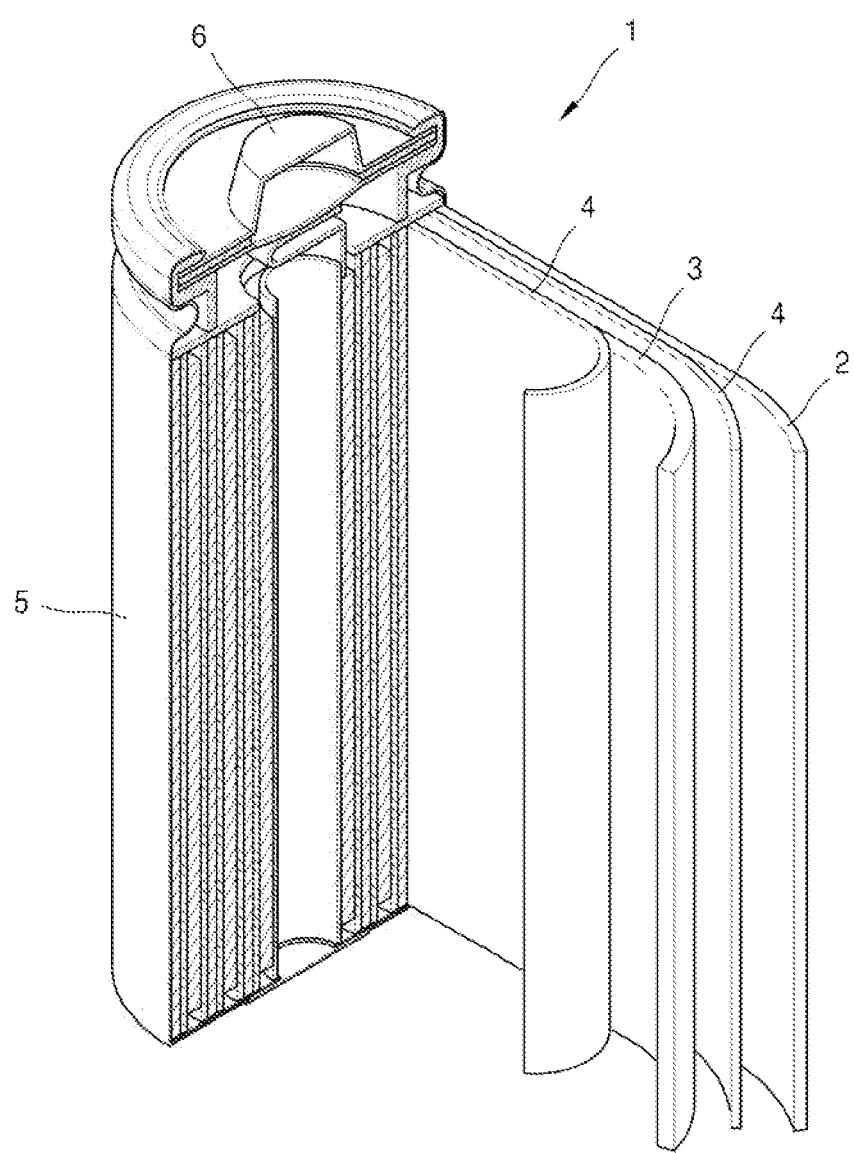
FIG. 1 is a schematic view of a lithium secondary battery according to an exemplary embodiment.

1: Lithium secondary battery 2: Anode
3: Cathode 4: Separator
5: Battery case 6: Cap assembly

MODE OF DISCLOSURE

Hereinafter, a lithium secondary battery according to exemplary embodiments will be described in more detail.

As used herein, "a" and "b" in "$C_a$-$C_b$" refer to the number of carbon atoms in a specific functional group. That is, the functional group may include "a" to "b" carbon atoms. Therefore, for example, the term "$C_1$-$C_4$ alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

Certain radical nomenclature may include mono-radicals or di-radicals
depending on the context. For example, when one substituent requires two connection points in the remaining molecule, it is to be understood that the substituent is a di-radical. For example, a substituent recognized as an alkyl group requiring two connecting points includes a di-radical such as —$CH_2$—, —$CH_2CH_2$—, or —$CH_2CH(CH_3)CH_2$—. Another radical nomenclature clearly indicates that the radical is a di-radical such as "alkylene" or "alkenylene".

As used herein, the term "alkyl group" refers to a branched or unbranched aliphatic hydrocarbon group. In an embodiment, an alkyl group may be substituted or unsubstituted. Examples of the alkyl group may include, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group. In another embodiment, each of these alkyl groups may be selectively substituted. In another embodiment, the alkyl group may include 1 to 6 carbon atoms. Examples of the alkyl group having 1 to 6 carbon atoms may include, but are not limited to, a methyl group, an ethyl group, a propyl group, an iso-propyl group, a butyl group, an iso-butyl group, a sec-butyl group, a pentyl group, a 3-pentyl group, and a hexyl group.

As used herein, the term "alkenyl group" is a hydrocarbon group having 2 to 20 carbon atoms including at least one carbon-carbon double bond, and examples thereof include, but are not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. In another embodiment, an alkenyl group may be substituted or unsubstituted. In another embodiment, the number of carbon atoms in the alkenyl group may be 2 to 40.

As used herein, the term "alkynyl group" is a hydrocarbon group having 2 to 20 carbon atoms including at least one carbon-carbon triple bond, and examples thereof include, but are not limited to, an ethynyl group, a 1-propynyl group, a 2-propynyl group, a 1-butynyl group, and a 2-butynyl group. In another embodiment, the alkynyl group may be substituted or unsubstituted. In another embodiment, the number of carbon atoms in the alkynyl group may be 2 to 40.

As used herein, a substituent may be derived from an unsubstituted parent group. Here, at least one hydrogen atom may be substituted with another atom or a functional group. Unless otherwise expressed, when a function group is considered "substituted", it means that the functional group is substituted with at least one substituent selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group. When it is described that one functional group is "selectively substituted", the functional group may be substituted with the aforementioned substituent.

A lithium secondary battery according to an aspect includes: a cathode; an anode; and an electrolyte interposed between the cathode and the anode, wherein the electrolyte includes at least one compound (A) represented by Formula 1 below and at least one compound (B) represented by Formula 2 below, and the lithium secondary battery has an operating voltage of more than 4.45 V:

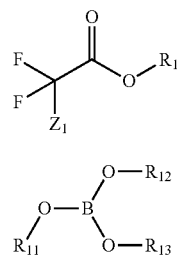

<Formula 1>

<Formula 2> wherein, in Formulae 1 and 2, $R_1$ and $R_{11}$ to $R_{13}$ are each independently selected from a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group, $Z_1$ is selected from hydrogen, a halogen, a cyano group, a $C_1$-$C_{10}$ alkoxy group, a hydroxyl group, a nitro group, a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group, and a substituent of each of the substituted $C_1$-$C_{30}$ alkyl group, substituted $C_2$-$C_{30}$ alkenyl group, and substituted $C_2$-$C_{30}$ alkynyl group is at least one selected from a $C_1$-$C_{10}$ alkyl group, a $C_2$-$C_{10}$ alkenyl group, a $C_1$-$C_{10}$ alkoxy group, a halogen, a cyano group, a hydroxyl group, and a nitro group.

When a lithium secondary battery exhibiting a high voltage and having an operating voltage of more than 4.45 V includes the compounds of Chemical Formulae 1 and 2 in the electrolyte, lifespan characteristics and high-temperature stability of the lithium secondary battery may be improved.

According to an embodiment, in Formulae 1 and 2, $R_1$ and $R_{11}$ to $R_{13}$ may be each independently a $C_1$-$C_{30}$ alkyl group or a $C_1$-$C_{30}$ alkyl group substituted with at least one selected from a methyl group, an ethyl group, a propyl group, a butyl group, —F, —Cl, —Br, —I, a cyano group, a hydroxyl group, and a nitro group.

For example, in Formula 1, $R_1$ may be selected from a methyl group, an ethyl group, a propyl group, an isopropyl group, a butyl group, an isobutyl group, a tert-butyl group, a pentyl group, and a hexyl group.

For example, in Formula 1, $R_1$ may be an ethyl group.

For example, in Formula 1, $Z_1$ may be hydrogen, a halogen, a cyano group, a $C_1$-$C_{10}$ alkoxy group, a hydroxyl group, or a nitro group. For example, in Formula 1, $Z_1$ may be hydrogen.

According to an embodiment, the compound (A) may be a compound 1 below:

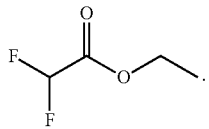

1

For example, in Formula 2, $R_{11}$ to $R_{13}$ may be each independently selected from a methyl group, an ethyl group, a propyl group, an isopropyl group, a butyl group, an isobutyl group, a tert-butyl group, a pentyl group, and a hexyl group.

For example, in Formula 2, at least one of $R_{11}$ to $R_{13}$ may be a propyl group. For example, in Formula 2, $R_{11}$ to $R_{13}$ may be propyl groups.

According to an embodiment, the compound (B) may be a compound 101 below:

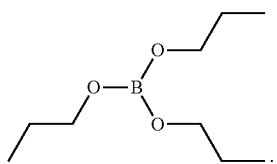

101

The reason how the compound (A) and the compound (B) are added to the electrolyte to improve the performance of the lithium secondary battery will be described in more detail below, but this is to help the understanding of the present disclosure, and the scope of the present disclosure is not It is not limited to the scope to be described later.

The compound represented by Formula 1 exhibits an effect of improving the reversible performance of the cathode by protecting the cathode during high voltage. Specifically, since the difluoro group has excellent electrical and chemical reactivity, it may form a donor-acceptor bond with the transition metal oxide exposed to the surface of the cathode active material, and thus a composite-type protective layer may be formed.

Further, curing the initial charging of the lithium secondary battery, the difluoro group attached to the transition metal oxide may be oxidized to a fluoro group, thus forming an inactive layer more stable at the cathode and having excellent ionic conductivity. Accordingly, it is possible to prevent the oxidation and decomposition of other components of the electrolyte, and as a result, the cycle characteristics of the lithium secondary battery can be improved and the occurrence of a swelling phenomenon can be prevented.

However, there is a problem in that the compound represented by Formula 1 above is reduced and decomposed at the anode to deteriorate the reversible performance of the anode. In order to solve such a problem, in the present disclosure, the borate-based compound represented by Formula 2 is included as an additive for forming an anode film.

As a result, both the cathode and the anode are protected, thereby improving the reversible performance and high-temperature lifespan of the high-voltage lithium secondary battery.

For example, the content of the compound (A) may be 10 wt % or less based on the total weight of the electrolyte, but is not limited thereto, and the content thereof may be appropriately selected within the range in which battery characteristics do not deteriorate. For example, the content of the compound (A) may be in the range of 0.01 wt % to 10 wt % based on the total weight of the electrolyte. For example, the content of the compound (A) may be in the range of 0.1 wt % to 10 wt % based on the total weight of the electrolyte. For example, the content of the compound (A) may be in the range of 0.1 wt % to 5 wt % based on the total weight of the electrolyte. For example, the content of the compound (A) may be in the range of 0.5 wt % to 5 wt % based on the total weight of the electrolyte. For example, the content of the compound (A) may be in the range of 0.5 wt % to 3 wt % based on the total weight of the electrolyte.

For example, the content of the compound (B) may be 10 wt % or less based on the total weight of the electrolyte, but is not limited thereto, and the content thereof may be appropriately selected within the range in which battery characteristics do not deteriorate. For example, the content of the compound (B) may be in the range of 0.01 wt % to 10 wt % based on the total weight of the electrolyte. For example, the content of the compound (B) may be in the range of 0.1 wt % to 10 wt % based on the total weight of the electrolyte. For example, the content of the compound (B) may be in the range of 0.1 wt % to 5 wt % based on the total weight of the electrolyte. For example, the content of the compound (B) may be in the range of 0.5 wt % to 5 wt % based on the total weight of the electrolyte. For example, the content of the compound (B) may be in the range of 0.5 wt % to 3 wt % based on the total weight of the electrolyte.

For example, the sum of the contents of the compound (A) and the compound (B) may be 0.01 wt % to 10 wt % based on the total weight of the electrolyte, but is not limited thereto, and the contents thereof may be appropriately selected within the range in which battery characteristics do not deteriorate.

When the content of the compound (A) or the compound (B) is out of the above content range and exceeds 10% by weight based on the total weight of the electrolyte for a lithium secondary battery, the additive acts as a resistance rather, resulting in a problem that the battery lifespan at a high temperature decreases due to an increase in interfacial resistance. On the other hand, when the content of the compound (A) or compound (B) is less than 0.1% by weight, it is difficult to exert a desired effect of the present disclosure.

For example, when the electrolyte includes the compound (A) and the compound (B), the content ratio of the compound (A) to the compound (B) may be 5:1 to 1:5, and, for example, may be 3:1 to 1:3, for example, 2:1 to 1:2.

According to an embodiment, the electrolyte may further include an aliphatic nitrile compound. For example, the aliphatic nitrile compound may include, but is not limited to, acetonitrile (AN), succinonitrile (SN), or 1,3,6-hexane tricarbonitrile (HTCN), but is not limited thereto, and any aliphatic nitrile compound may be used as long as it includes a nitrile group at the end of hydrocarbon.

For example, the aliphatic nitrile compound may include at least one of succinonitrile (SN) and 1,3,6-hexane tricarbonitrile (HTCN).

For example, the content of the aliphatic nitrile compound may be in the range of 0.1 wt % to 10 wt % based on the total weight of the electrolyte, but is not limited thereto, and the content thereof may be appropriately selected within the range in which effects of the reversibility and high-temperature lifespan stability of the cathode and anode do not deteriorate.

According to an embodiment, the electrolyte may further include at least one additive selected from tris(trimethylsilyl)phosphate (TMSPa), lithium difluorooxalatoborate (LiFOB), propanesultone (PS), a silane compound having a functional group capable of forming a siloxane bond, and a silazane compound.

For example, the content of the additive may be in the range of 0.1 wt % to 10 wt % based on the total weight of the electrolyte, but is not limited thereto, and the content thereof may be appropriately selected within the range in which effects of the reversibility and high-temperature lifespan stability of the cathode and anode do not deteriorate.

According to an embodiment, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($2 \leq x \leq 20$, $2 \leq y \leq 20$), LiCl, LiI, lithium bis(oxalato)borate (LiBOB), and $LiPO_2F_2$, but is not limited thereto. Any lithium salt may be used as long as it is used in the art.

The concentration of the lithium salt in the electrolyte may be 0.01 to 2.0 M, but is not necessarily limited to this range, and an appropriate concentration may be used as necessary. Further improved battery characteristics may be obtained within the above concentration range.

According to an embodiment, the organic solvent may include at least one selected from ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC)), vinylene carbonate (VC), vinylethylene carbonate (VEC), butylene carbonate, ethyl propionate (EP), propyl propionate (PP), ethyl butyrate, dimethyl sulfoxide, dimethylformamide, dimethyl acetamide, gamma-valerolactone, gamma-butyrolactone and tetrahydrofuran, but is not limited thereto. Any organic solvent may be used as long as it is used in the art.

The electrolyte may be present in a liquid or gel state. The electrolyte may be prepared by adding the lithium salt, the above-described compound, and the additive to the organic solvent.

The form of the lithium secondary battery is not limited, and includes a lithium secondary battery such as a lithium ion battery, a lithium ion polymer battery, and a lithium sulfur battery, as well as a lithium primary battery.

The operating voltage of the lithium secondary battery may be 4.46 V or more, for example, 4.47 V or more.

For example, the lithium secondary battery may be manufactured by the following method.

First, a cathode is prepared.

For example, a cathode active material composition in which a cathode active material, a conductive material, a binder, and a solvent are mixed is prepared. A cathode plate is prepared by coating a cathode current collector with the cathode active material composition. Alternatively, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation as long as it is generally used in the art. As the lithium-containing metal oxide, for example, two or more kinds of composite oxides of lithium and a metal selected from cobalt, manganese, nickel, and combinations thereof may be used. Specifically, as lithium-containing metal oxide, a compound represented by any one of Formulae of $Li_aA_{1-b}B^1{}_bD^1{}_2$ (where, $0.90 \leq a \leq 1.8$ and $0 \leq b \leq 0.5$ are satisfied); $Li_aE_{1-b}B^{1b}O_{2-c}D^1{}_c$ (where, $0.90 \leq a \leq 1.8$, $0 \leq b \leq 0.5$, and $0 \leq c \leq 0.05$ are satisfied); $LiE_{2-b}B^1{}_bO_{4-c}D^1{}_c$ (where, $0 \leq b \leq 0.5$ and $0 \leq c \leq 0.05$ are satisfied); $Li_aNi_{1-b-c}Co_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$ (where, $0.90 \leq a \leq 1.8$, $0 \leq b \leq 0.5$, $0 \leq c \leq 0.05$, and $0 \leq \alpha \leq 2$ are satisfied); $Li_aNi_{1-b-c}Co_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cD^{1\alpha}$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^{1\alpha}$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-F)}J_2(PO_4)_3$ ($0 \leq f \leq 2$); $Li_{(3-F)}Fe_2(PO_4)_3$ ($0 \leq f \leq 2$); and $LiFePO_4$ may be used.

In Formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the compound may be $LiCoO_2$, $LiMn_gO_{2g}$ (g=1, 2), $LiNi_{1-g}Mn_gO_{2g}$ ($0<g<1$), $LiNi_{1-g-k}Co_gMn_kO_2$ ($0 \leq g \leq 0.5$, $0 \leq k \leq 0.5$), or $LiFePO_4$.

Specifically, the cathode may include a cathode active material having a layered structure.

For example, the cathode active material may be represented by Formula 3 below:

$LiNi_{1-s}M'_sO_2$            <Formula 3> in Formula 3, M' is at least one selected from Co, Mn, Al, Cu, Fe, Mg, Cr, Zn, B, and Ga, and $0 \leq s \leq 0.5$ is satisfied.

Of course, a compound having a coating layer on the surface of the compound may be used, or a mixture of the compound and a compound having a coating layer may also be used. This coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

The conductive material may be carbon black or graphite particles, but is not limited thereto. Any conductive material may be used as long as it can be used in the related technical field.

Examples of the binder may include, but are not limited to, a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer, any binder may be used as long as it can be used in the related technical field.

As the solvent, N-methylpyrrolidone, acetone, water, or the like may be used, but the present disclosure is not limited thereto. Any solvent may be used as long as it can be used in the related technical field.

The content of the cathode active material, the content of the conductive material, the content of the binder, and the content of the solvent are levels commonly used in the lithium secondary battery. At least one of the conductive material, the binder, and the solvent may be omitted depending on the use and configuration of the lithium secondary battery.

Next, an anode is prepared.

For example, an anode active material composition in which an anode active material, a conductive material, a binder, and a solvent are mixed is prepared. An anode plate is prepared by directly coating an anode current collector with the anode active material composition and drying the anode active material composition. Alternatively, the anode plate may be prepared by casting the anode active material composition onto a separate support, separating a film from the support and then laminating the separated film on a metal current collector.

The anode active material may be used without limitation. Any anode active material may be used as long as it can be used in the related technical field. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, not Si), or a Sn—Y alloy (Y is an alkaline metal, an alkaline earth metal, a group 13 element, a group 14 element, a transition metal, or a combination thereof, not Sn). The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbon-based material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The conductive material, binder and solvent in the anode active material composition may be the same as those in the cathode active material composition.

The contents of the anode active material, the conductive material, the binder, and the solvent are levels commonly used in the lithium secondary battery. At least one of the conductive material, the binder, and the solvent may be omitted depending on the use and configuration of the lithium secondary battery.

Next, a separator to be inserted between the cathode and the anode is prepared.

As the separator, any separator may be used as long as it is commonly used in a lithium battery. A separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium ion battery, and a separator having good electrolyte impregnation ability may be used in a lithium ion polymer battery. For example, the separator may be produced by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the production of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, the above-described electrolyte is prepared.

As shown in FIG. 1, the lithium secondary battery 1 includes a cathode 3, an anode 2, and a separator 4. The anode 3, the cathode 2, and the separator 4 are wound or folded and accommodated in a battery case 5. Subsequently, an electrolyte for a lithium secondary battery is injected into the battery case 5, and the battery case 5 is sealed with a cap assembly 6 to complete the manufacture of the lithium secondary battery 1. The battery case 5 may have a cylindrical shape, a rectangular shape, or a thin film shape. For example, the lithium secondary battery 1 may be a large-sized thin-film battery. The lithium secondary battery 1 may be a lithium ion battery.

The separator may be located between the cathode and the anode to form a battery structure. The battery structure is laminated as a bi-cell structure and then impregnated with an electrolyte, and the resulting product is accommodated in a pouch and sealed to complete a lithium ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

Further, since the lithium secondary battery is excellent in lifespan characteristics and high-rate characteristics, it may be used in electric vehicles (EV). For example, the lithium secondary battery may be used in hybrid vehicles such as plug-in hybrid electric vehicles. Further, the lithium secondary battery may be used in fields requiring a large amount of electric power storage. For example, the lithium secondary battery may be used in electric bicycles, electric tools, and the like.

Hereinafter, the present disclosure will be described in more detail with reference to Examples and Comparative Examples. However, these Examples are for illustrating the present disclosure, and the scope of the present disclosure is not limited thereto.

Preparation of Electrolyte

Comparative Preparation Example 1

1.3 M LiPF$_6$ was added to a solvent mixture in which ethylene carbonate (EC), propylene carbonate (PC), ethyl propionate (EP), and propyl propionate (PP) were mixed at a volume ratio of 15:15:25:45, to prepare a mixed solution.

Based on the mixed solution, 7 wt % of FEC, 3 wt % of PS, 2 wt % of SN, and 3 wt % of HTCN were added to prepare an electrolyte.

Comparative Preparation Example 2

An electrolyte was prepared in the same manner as in Comparative Preparation Example 1, except that 1 wt % of the following Compound 1 was added based on the mixed solution.

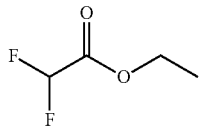

1

Comparative Preparation Example 3

An electrolyte was prepared in the same manner as in Comparative Preparation Example 1, except that 1 wt % of the following Compound 101 was added based on the mixed solution.

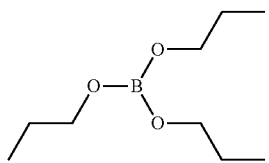

101

Preparation Example 1

An electrolyte was prepared in the same manner as in Comparative Preparation Example 1, except that 1 wt % of the Compound 1 and 1 wt % of the Compound 101 were added Preparation Example 2

An electrolyte was prepared in the same manner as in Preparation Example 1, except that SN was not added.

Preparation Example 3

An electrolyte was prepared in the same manner as in Preparation Example 1, except that HTCN was not added.

Preparation Example 4

An electrolyte was prepared in the same manner as in Preparation Example 1, except that SN and HTCN were not added.

Manufacture of Lithium Secondary Battery

Example 1

98 wt % of artificial graphite (BSG-L, Tianjin BTR New Energy Technology Co., Ltd.), 1.0 wt % of styrene-butadiene rubber (SBR) binder (ZEON), and 1.0 wt % of carboxymethyl cellulose (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

(Preparation of Cathode)

96 wt % of LiCoO$_2$, 2 wt % of carbon black (Ketjenblack, ECP) as a conductive material, and 2 wt % of polyvinylidene fluoride (PVdF, S6020, Solvay) as a binder were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured by using a polyethylene separator having a thickness of 14 μm and coated with ceramic on a side of anode and using the electrolyte prepared in Preparation Example 1. The operating voltage of the lithium secondary battery was 4.47 V.

Comparative Examples 1 to 3

Lithium secondary batteries were manufactured in the same manner as in Example 1, except that the electrolytes prepared in Comparative Preparation Example 1 to 3 were used instead of the electrolyte prepared in Preparation Example 1.

Reference Examples 1 to 3

Lithium secondary batteries were manufactured in the same manner as in Example 1, except that the electrolytes prepared in Preparation Examples 2 to 4 were used instead of the electrolyte prepared in Preparation Example 1.

Comparative Example 4

98 wt % of artificial graphite (BSG-L, Tianjin BTR New Energy Technology Co., Ltd.), 1.0 wt % of styrene-butadiene rubber (SBR) binder (ZEON), and 1.0 wt % of carboxymethyl cellulose (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

(Preparation of Cathode)

96 wt % of $LiCoO_2$, 2 wt % of carbon black (Ketjenblack, ECP) as a conductive material, and 2 wt % of polyvinylidene fluoride (PVdF, S6020, Solvay) as a binder were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured by using a polyethylene separator having a thickness of 14 μm and coated with ceramic on a side of anode and using the electrolyte prepared in Preparation Example 1. The operating voltage of the lithium secondary battery was 4.45 V.

Comparative Example 5

A lithium secondary battery was manufactured in the same manner as in Comparative Example 2, except that the electrolyte prepared in Preparation Example 1 was used instead of the electrolyte prepared in Comparative Preparation Example 1.

Evaluation Example 1: Electrode Reversibility Test

Cathode reversibility tests and anode reversibility tests were performed on the lithium secondary batteries prepared in Comparative Examples 1 to 3, and the results are shown in FIGS. 2A to 2C and 3A to 3C, respectively.

The cathode reversibility test was performed by manufacturing a cathode half cell and then evaluating the cathode half cell at a voltage range of 3.0 V to 4.6 V during 5 cycles using cyclic voltammetry.

The anode reversibility test was performed by manufacturing an anode half cell and then evaluating the anode half cell at a voltage range of 3.0 V to 0 V during 5 cycles using cyclic voltammetry.

Figure 2A:
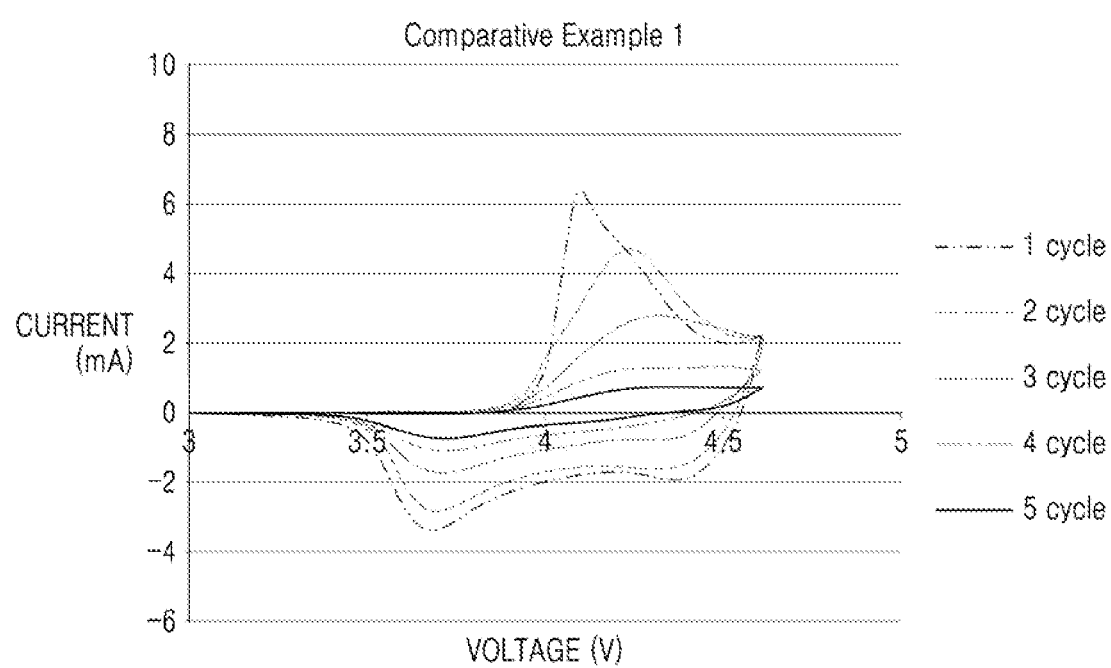
FIGS. 2A to 2C show the results of cathode reversibility tests for lithium secondary batteries manufactured in Comparative Examples 1 to 3.
Figure 2B:
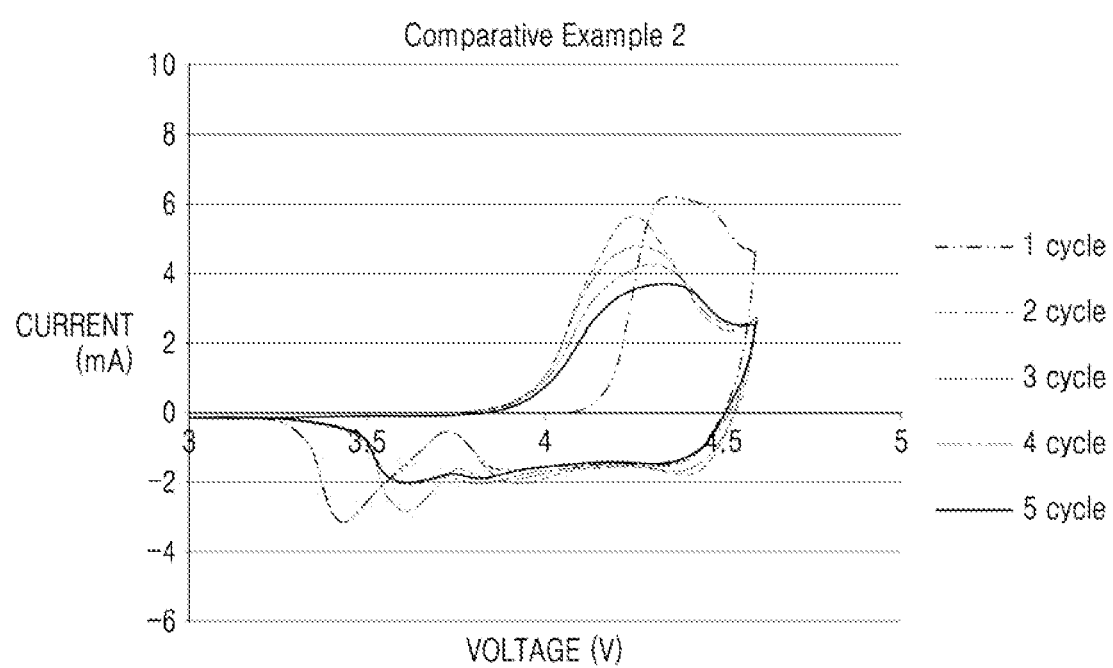
Figure 2C:
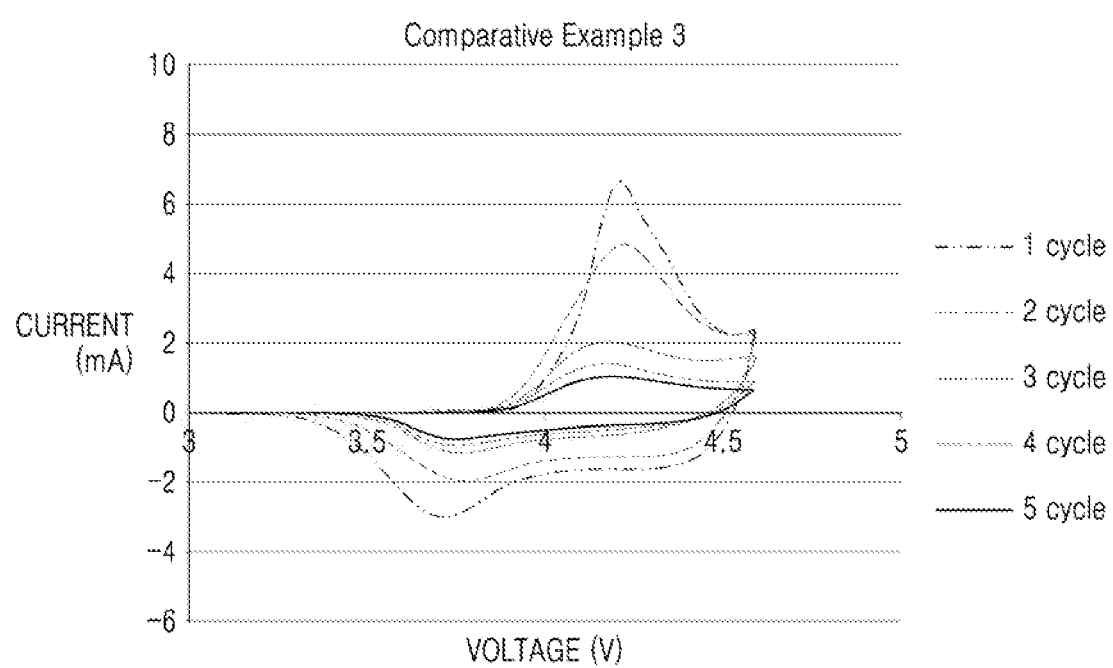

FIG. 2A shows a result of a cathode reversibility test of the lithium secondary battery manufactured in Comparative Example 1, FIG. 2B shows a result of a cathode reversibility test of the lithium secondary battery manufactured in Comparative Example 2, and FIG. 2C shows a result of a cathode reversibility test of the lithium secondary battery manufactured in Comparative Example 3.

Figure 3A:
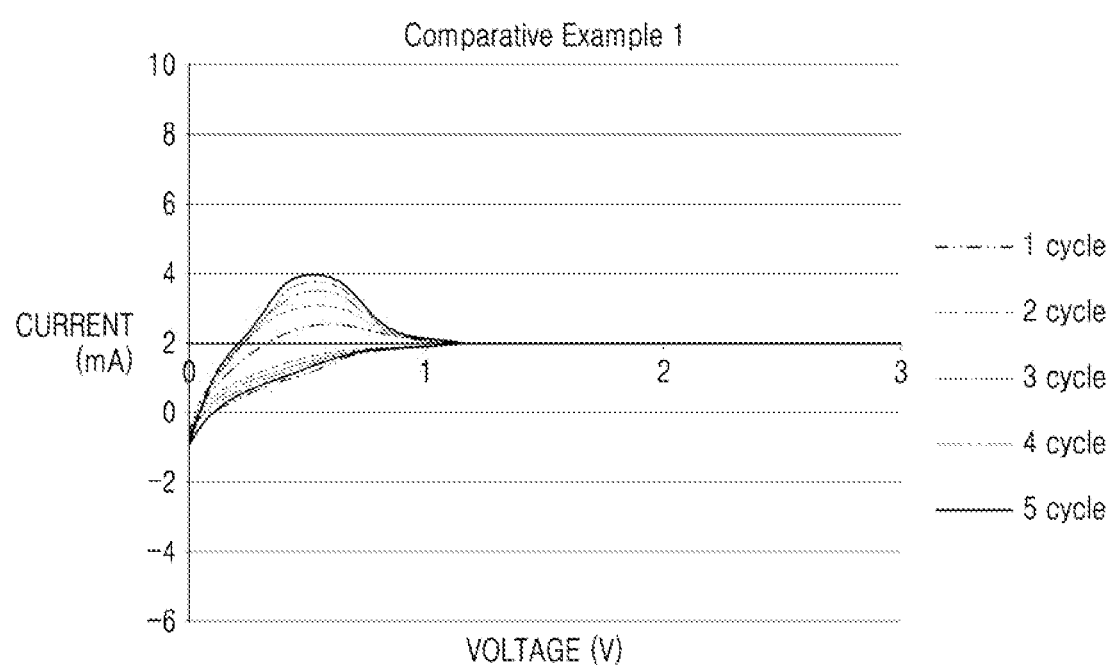
FIGS. 3A to 3C show the results of anode reversibility tests for lithium secondary batteries manufactured in Comparative Examples 1 to 3.
Figure 3B:
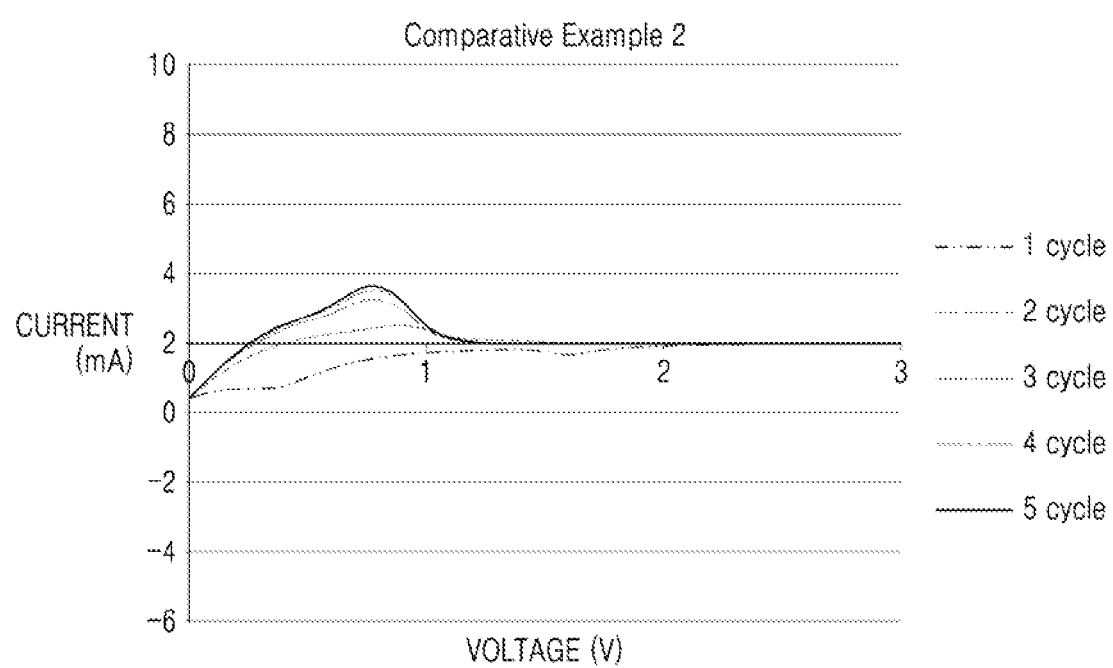
Figure 3C:
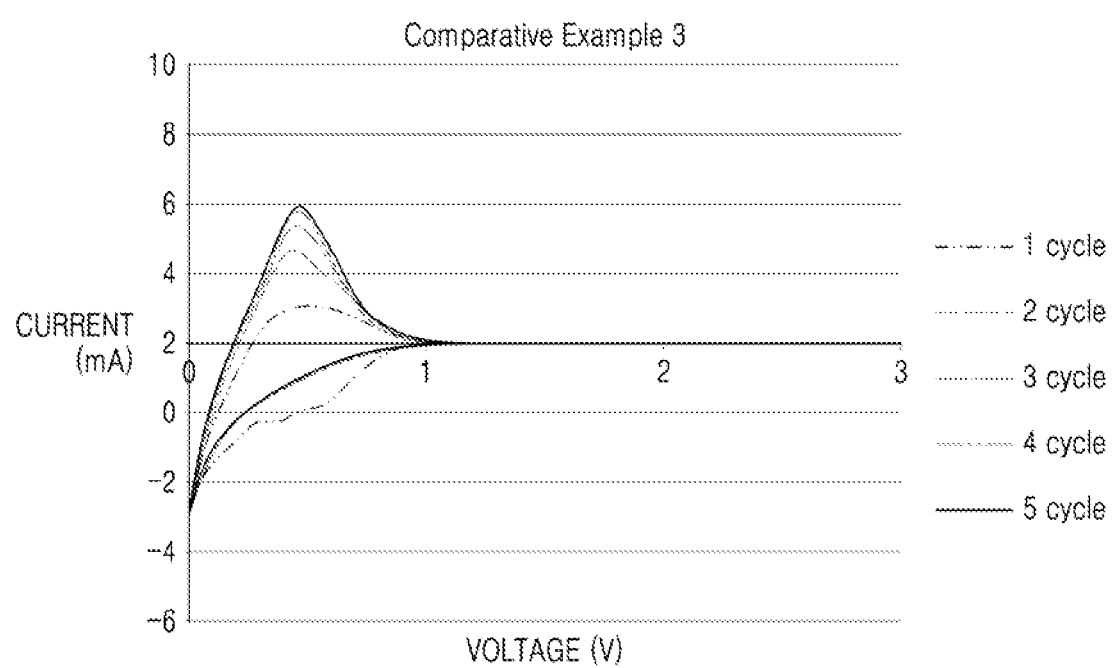

FIG. 3A shows a result of an anode reversibility test of the lithium secondary battery manufactured in Comparative Example 1, FIG. 3B shows a result of an anode reversibility test of the lithium secondary battery manufactured in Comparative Example 2, and FIG. 3C shows a result of an anode reversibility test of the lithium secondary battery manufactured in Comparative Example 3.

Evaluation Example 2: High-Temperature (45° C.) Lifespan Test

Each of the lithium secondary batteries manufactured in Example 1 and Comparative Examples 1 to 3 was charged with a constant current at a rate of 1 C at high temperature (45° C.) until a voltage reached 4.5 V, and was then discharged with a constant current until the voltage reached 3.0 V. After this charge-discharge cycle was repeated 200 times, discharge capacity was measured, and the results of comparing the discharge capacity with a capacity retention rate are shown in FIG. 4.

Figure 4:
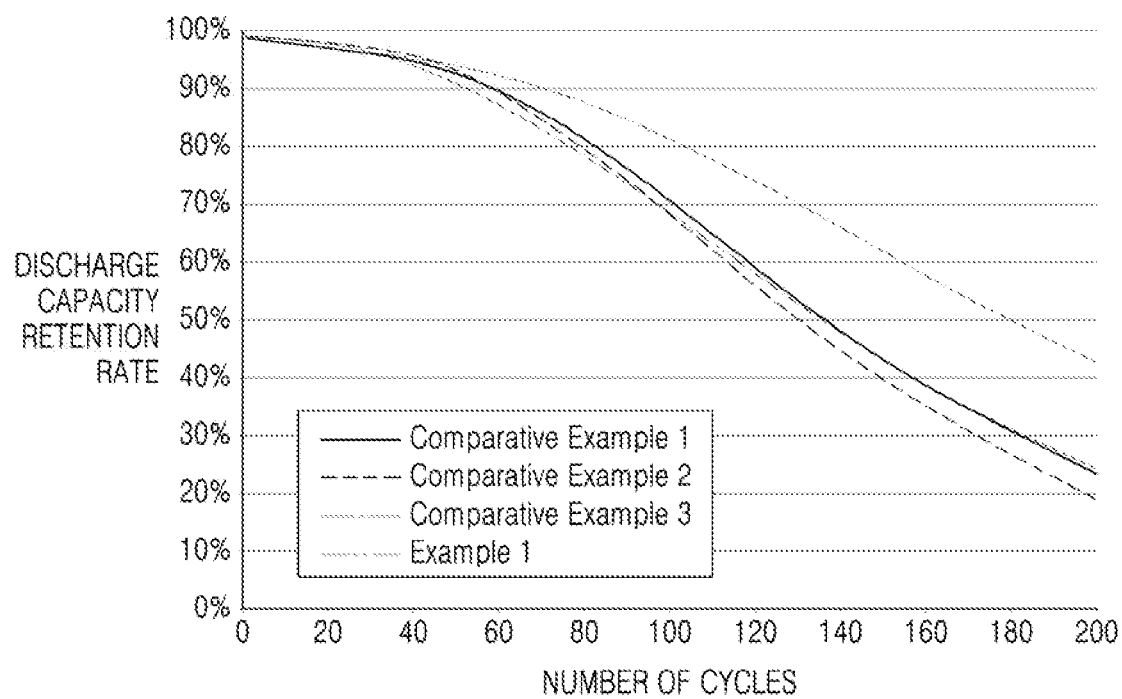
FIG. 4 shows the results of high-temperature (45° C.) lifespan tests for lithium secondary batteries manufactured in Example 1 and Comparative Examples 1 to 3.

As shown in FIG. 4, it may be confirmed that the lithium secondary battery of Example 1 exhibits an excellent high-temperature capacity retention rate as compared with the lithium secondary batteries of Comparative Examples 1 to 3.

Evaluation Example 3: High-Temperature (45° C.) Lifespan Test

Each of the lithium secondary batteries manufactured in Example 1 and Comparative Examples 1, 4 and 5 was charged with a constant current at a rate of 1 C at high temperature (45° C.) until a voltage reached 4.5 V, and was then discharged with a constant current until the voltage reached 3.0 V. After this charge-discharge cycle was repeated 200 times, discharge capacity was measured, and the results of comparing the discharge capacity with a capacity retention rate are shown in FIG. 5.

Figure 5:
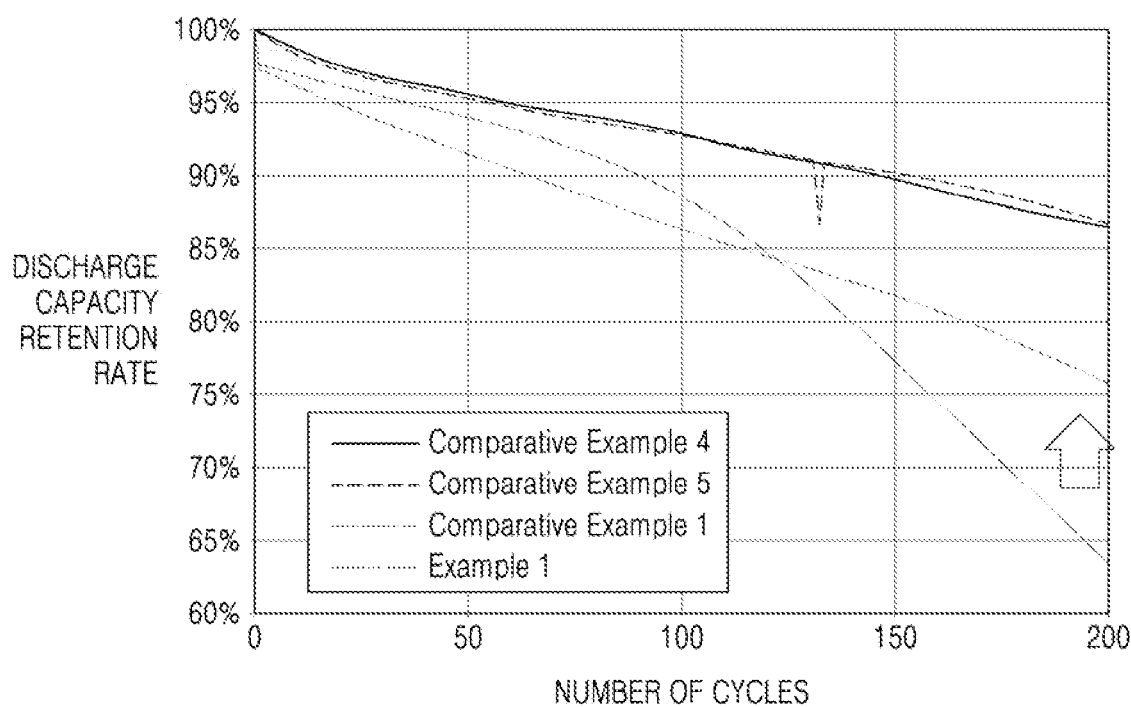
FIG. 5 shows the results of high-temperature (45° C.) lifespan tests for lithium secondary batteries manufactured in Example 1 and Comparative Examples 1, 4 and 5.

Referring to FIG. 5, it may be confirmed that in the case of Comparative Examples 4 and 5 in which an operating voltage is 4.45 V, even when the compound 1 and compound 101 of the present disclosure are included in the electrolyte (Comparative Example 5), a difference in high-temperature lifespan characteristics does not occurs as compared with the case where the compound 1 and compound 101 thereof are not included.

In contrast, it may be confirmed that in the case of Example 1 and Comparative Example 1 in which an operating voltage is 4.47 V, the lithium secondary battery of Example 1 including the compound 1 and compound 101 of the present disclosure in the electrolyte has much better high-temperature lifespan characteristics after 200 cycles than the lithium secondary battery of Comparative Example 1 not including the compound 1 and compound 101 thereof.

Evaluation Example 4: High-Temperature (45° C.) Lifespan Test

Each of the lithium secondary batteries manufactured in Example 1 and Comparative Example 1 was charged with a constant current at a rate of 1 C at high temperature (45° C.) until a voltage reached 4.5 V, and was then discharged with a constant current until the voltage reached 3.0 V. After this charge-discharge cycle was repeated 200 times, discharge capacity was measured, and the results of comparing the discharge capacity with a capacity retention rate are shown in FIG. 6.

Figure 6:
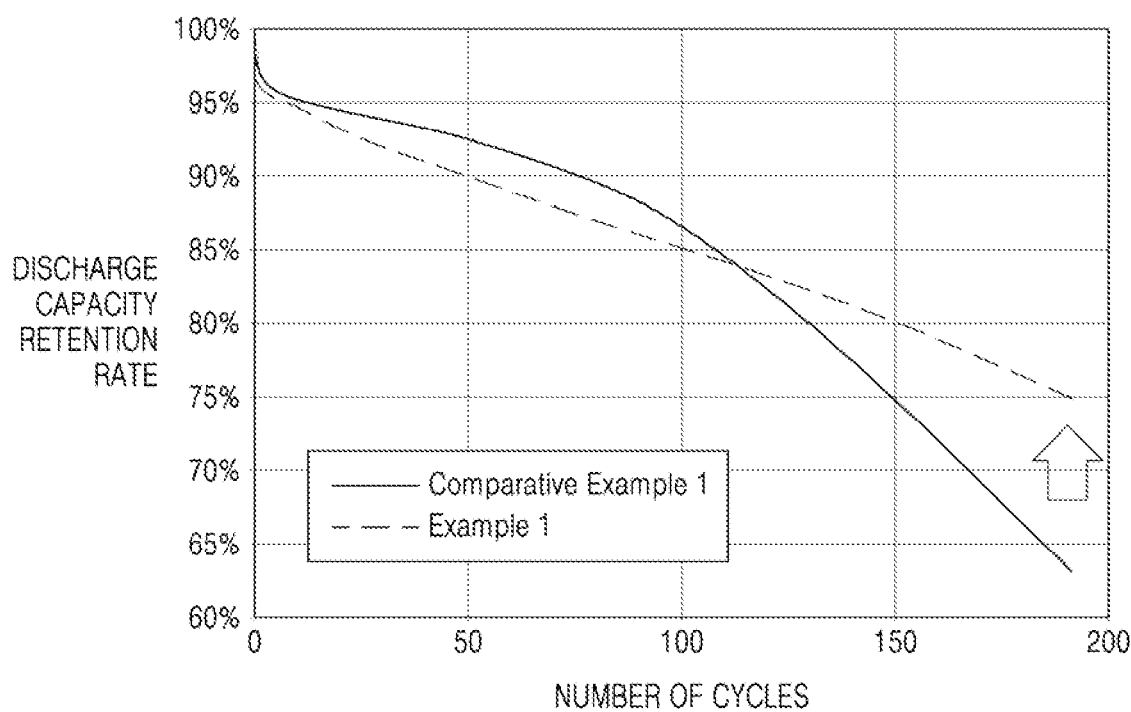
FIG. 6 shows the results of high-temperature (45° C.) lifespan tests for lithium secondary batteries manufactured in Example 1 and Comparative Example 1.

Referring to FIG. 6, it may be confirmed that the lithium secondary battery of Example 1 including the compound 1 and compound 101 of the present disclosure in the electrolyte has much better high-temperature lifespan characteristics after 200 cycles than the lithium secondary battery of Comparative Example 1 not including the compound 1 and compound 101 thereof.

Evaluation Example 5: High-Temperature (45° C.) Lifespan Test

Each of the lithium secondary batteries manufactured in Example 1, Comparative Example 1 and Reference Examples 1 to 3 was charged with a constant current at a rate of 1 C at high temperature (45° C.) until a voltage reached 4.5 V, and was then discharged with a constant current until the voltage reached 3.0 V. After this charge-discharge cycle was repeated 100 times, discharge capacity was measured, and the results of comparing the discharge capacity with a capacity retention rate are shown in FIG. 7.

Figure 7:
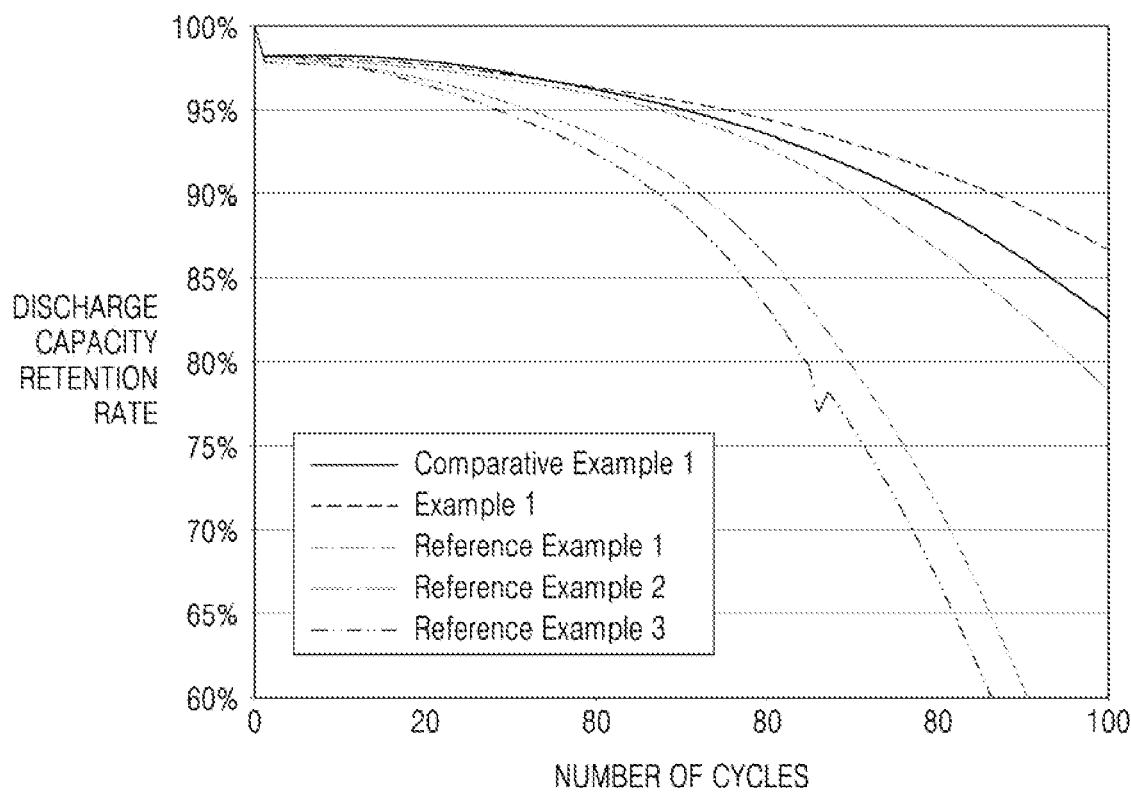
FIG. 7 shows the results of high-temperature (45° C.) lifespan tests for lithium secondary batteries manufactured in Example 1 and Comparative Example 1, and Reference Examples 1 to 3.

Referring to FIG. 7, it may be confirmed that the lithium secondary battery of Example 1 including the compound 1 and compound 101 of the present disclosure in the electrolyte has much better high-temperature lifespan characteristics after 200 cycles than the lithium secondary battery of Comparative Example 1 not including the compound 1 and compound 101 thereof. In addition, it may be confirmed that even when the compound 1 and the compound 101 are included in the electrolyte, in the case (Reference Examples 1 to 3) where succinonitrile (SN) or 1,3,6-hexane tricarbonitrile (HTCN), which is an aliphatic nitrile compound, is not included in the electrolyte, rather, the discharge capacity retention rate characteristics are further deteriorated than that of the lithium secondary battery of Comparative Example 1 not including the compound 1 and the compound 101.

INDUSTRIAL APPLICABILITY

When a novel electrolyte including an additive including a difluoroacetate-based compound and an alkylborate-based compound is used for high-voltage lithium secondary batteries, high-voltage reversible performance and high-temperature lifespan characteristics of the lithium secondary battery may be improved.

The invention claimed is:

1. A lithium secondary battery comprising: a cathode; an anode; and an electrolyte interposed between the cathode and the anode, wherein
the electrolyte includes at least one compound (A) represented by Formula 1 below and at least one compound (B) represented by Formula 2 below, and the lithium secondary battery has an operating voltage of 4.45 V or more:

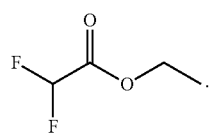

<Formula 1>

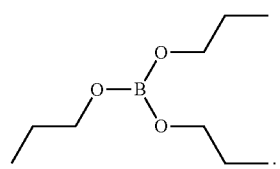

<Formula 2> wherein, in Formulae 1 and 2,
$R_1$ and $R_{11}$ to $R_{13}$ are each independently selected from a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group,
$Z_1$ is selected from hydrogen, a halogen, a cyano group, a $C_1$-$C_{10}$ alkoxy group, a hydroxyl group, a nitro group, a substituted or unsubstituted $C_1$-$C_{30}$ alkyl group, a substituted or unsubstituted $C_2$-$C_{30}$ alkenyl group, and a substituted or unsubstituted $C_2$-$C_{30}$ alkynyl group, and
a substituent of each of the substituted $C_1$-$C_{30}$ alkyl group, substituted $C_2$-$C_{30}$ alkenyl group, and substituted $C_2$-$C_{30}$ alkynyl group is at least one selected from a $C_1$-$C_{10}$ alkyl group, a $C_2$-$C_{10}$ alkenyl group, a $C_1$-$C_{10}$ alkoxy group, a halogen, a cyano group, a hydroxyl group, and a nitro group.

2. The lithium secondary battery of claim 1, wherein, in Formulae 1 and 2, $R_1$ and $R_{11}$ to $R_{13}$ are each independently a $C_1$-$C_{30}$ alkyl group or a $C_1$-$C_{30}$ alkyl group substituted with at least one selected from a methyl group, an ethyl group, a propyl group, a butyl group, —F, —Cl, —Br, —I, a cyano group, a hydroxyl group, and a nitro group.

3. The lithium secondary battery of claim 1, wherein, in Formula 1, $R_1$ is an ethyl group.

4. The lithium secondary battery of claim 1, wherein the compound (A) is a compound 1 below:

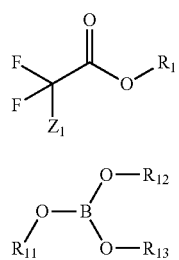

1

5. The lithium secondary battery of claim 1, wherein, in Formula 2, at least one of $R_{11}$ to $R_{13}$ is a propyl group.

6. The lithium secondary battery of claim 1, wherein the compound (B) is a compound 101 below:

101

7. The lithium secondary battery of claim 1, wherein a content of the compound (A) is 0.01 wt % to 10 wt % based on a total weight of the electrolyte for lithium secondary batteries.

8. The lithium secondary battery of claim 1, wherein a content of the compound (B) is 0.01 wt % to 10 wt % based on a total weight of the electrolyte for lithium secondary batteries.

9. The lithium secondary battery of claim 1, wherein the sum of a content of the compound (A) and a content of the compound (B) is 0.1 wt % to 10 wt % based on a total weight of the electrolyte.

10. The lithium secondary battery of claim 1, wherein the electrolyte further includes an aliphatic nitrile compound.

11. The lithium secondary battery of claim 10, wherein the aliphatic nitrile compound includes at least one of succinonitrile (SN) and 1,3,6-hexane tricarbonitrile (HTCN).

12. The lithium secondary battery of claim 10, wherein a content of the aliphatic nitrile compound is 0.1 wt % to 10 wt % based on a total weight of the electrolyte.

13. The lithium secondary battery of claim 1, wherein the electrolyte further includes at least one additive selected from tris(trimethylsilyl)phosphate (TMSPa), lithium difluorooxalatoborate (LiFOB), propane sultone (PS), a silane compound having a functional group capable of forming a siloxane bond, and a silazane compound.

14. The lithium secondary battery of claim 1, wherein the anode includes at least one of lithium metal, a metal alloyable with lithium, a transition metal oxide, a non-transition metal oxide, and a carbon-based material.

15. The lithium secondary battery of claim 1, wherein the cathode includes a cathode active material having a layered structure.

16. The lithium secondary battery of claim 15, wherein the cathode active material is represented by Formula 3:

$$LiNi_{1-s}M'_sO_2 \qquad <\text{Formula 3}>$$

wherein, in Formula 3,

M' is at least one selected from the group consisting of Ni, Mn, Al, Cu, Fe, Mg, Cr, Zn, B, and Ga, and $0 \leq s \leq 0.5$.

\* \* \* \* \*